Nov. 9, 1965 A. C. SHAFFER 3,216,814
BENDING MOLD WITH LEADING APERTURED PLATE
Filed May 2, 1960 2 Sheets-Sheet 1
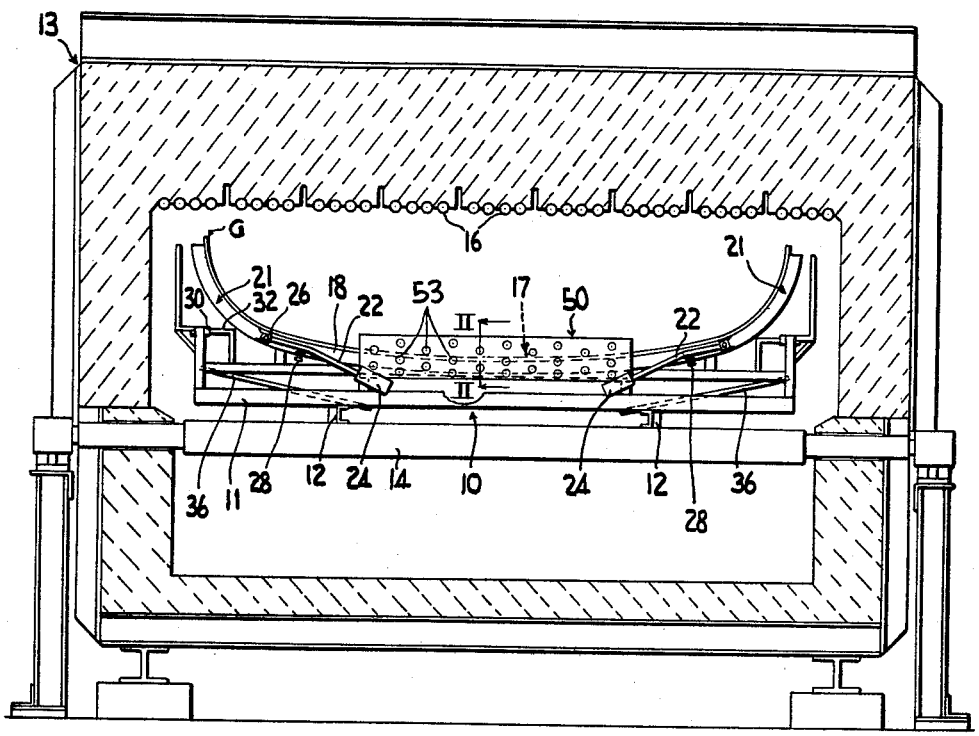
FIG. 1
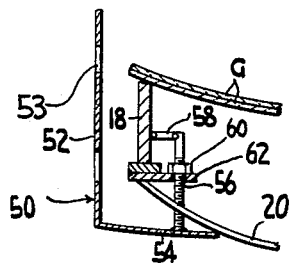
FIG. 2
FIG. 4
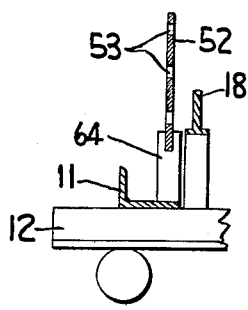
INVENTOR
ALVIN C. SHAFFER
BY
Oscar L. Spencer
ATTORNEY Nov. 9, 1965 A. C. SHAFFER 3,216,814
BENDING MOLD WITH LEADING APERTURED PLATE
Filed May 2, 1960 2 Sheets-Sheet 2

INVENTOR
ALVIN C. SHAFFER
BY
Oscar H. Spencer
ATTORNEY

United States Patent Office 3,216,814
Patented Nov. 9, 1965

3,216,814
BENDING MOLD WITH LEADING APERTURED PLATE
Alvin Clair Shaffer, New Kensington, Pa., assignor to Pittsburgh Plate Glass Company, a corporation of Pennsylvania
Filed May 2, 1960, Ser. No. 26,070
5 Claims. (Cl. 65—288)

The present invention relates to treating glass sheets, and specifically is concerned with the control of stresses along the marginal edge of bent glass sheets.

Glass sheets are bent for automotive windshield production by mounting the sheets in pairs on sectionalized, skeletonized molds whose sections are composed of one or more edgewise disposed rails whose upper edges conform to the shape desired for a portion of the bent glass. The sections are pivoted to each other to move into a spread mold position for receiving flat glass sheets for bending and into a closed mold position wherein the upper edges of the rails provide a substantially continuous shaping surface conforming in elevation and outline to the shape desired for the bent glass sheets and having dimensions slightly less than those of the bent glass sheets. The sections are so constructed that they normally tend to pivot into the closed mold position unless constrained from movement thereby by the force provided by a rigid glass sheet carried on such a mold.

In present commercial windshield production, glass sheets are mounted in pairs on mold spread for bending. The molds are conveyed transversely through a tunnel-like bending lehr having different temperature zones. The first of these zones is a preheat zone wherein the temperature of the glass is raised to substantially its softening point. Beyond this zone is a bending zone wherein the glass is further heated with especially intense heat applied to the regions to be bent most sharply. The additional heat supplied in the bending zone heat-softens the glass, thus reducing the force due to the mass of the rigid glass sheet opposing the tendency of the mold sections to move into the closed mold position. Movement of the mold sections into the closed mold position helps the glass to conform to the shaping surface of the upper edges of the mold rail.

The bent glass sheets are then annealed by controlled cooling as they are conveyed through an annealing zone having successive regions. The temperature of each successive region in the annealing zone traversed by the bent glass sheets is lower than that of its preceding region in the annealing zone.

Since mass production requires the fastest possible rate of production of windshields, the flat glass industry has attempted to increase the production rates by moving the glass sheets as rapidly as possible through the bending lehrs, thereby increasing the temperature gradients imposed on the sheets during bending and annealing. Specifically, it has been found that the glass sheets tend to develop tension stresses in a narrow band approximately ¼ to ⅜ inch laterally within the leading side edge that is conveyed through the lehr. These bands of tension stress are weaknesses in the glass that causes the glass to form vents, usually in the form of a button-hook shape extending from 3 to 4 inches from the edge of the sheet.

It has been theorized that the stresses imposed at the periphery of the glass result from the relative rates of cooling of the glass edge which extends slightly beyond the mold rail and the portion in contact with the mold rail. The relative cooling rate of the edge and a portion within the edge as the glass cools through its annealing range (roughly 1050° F. to 950° F. for plate glass) determines the permanent stresses imposed in the glass. The peripheral edge of the glass, particularly its leading edge, is completely exposed to the lehr atmosphere and tends to cool more rapidly than the portion in contact with the mold rail which has its cooling rate retarded. Thus, a high compression stress is normally established in the periphery of the glass and a high tension stress counterbalancing the compression stress tends to result in the portion immediately within the perimeter of the glass. As long as the compression skin at the perimeter surrounds the tension stressed interior, no harm results. However, once the compression skin is pierced as by a fine surface scratch, the magnitude of the internal tension stress determines whether the surface scratch heals or deteriorates into a serious vent.

It is very difficult to bend glass sheets rapidly on a mass production basis while controlling its maximum internal tension stress. It has been determined that if the tension stresses are reduced, the bent glass sheets are less vulnerable to breakage from scratches in this area. Instead, surface scratches heal rather than cause vents at these controlled internal stresses.

Previous work on the manufacture of bent glass sheets has determined that the best orientation of the glass sheet for conveyance through a bending lehr involves moving a glass sheet transversely. This technique results in establishing a thermal gradient between the leading side edge of the glass and the portion immediately adjacent the side edge when the bent glass sheets are conveyed through an annealing zone of progressively decreasing temperature. The steepness of the thermal gradient is a function of the rate of change of temperature to which the glass sheets are subjected during annealing.

If the glass sheets are moved rapidly through the annealing zone, these thermal gradients are steep. Such steep thermal gradients result in a high compression stress zone at the leading side edge of the glass and a relatively high tension stress zone in the interior of the glass surrounded by the leading edge and surface compression zone.

An obvious solution for this problem would be to reduce the speed at which the glass sheets move through the bending lehr, thus reducing the thermal gradients which produce the elevated stresses within the glass. However, the insatiable appetites of the automobile manufacturers for bent windshields makes it necessary to maintain a high rate of production.

It has previously been suggested in application Serial No. 732,677 of Shaffer and Reese, filed May 2, 1958, now abandoned for Treating Glass Sheets, to control the relative rate of cooling of the peripheral margin of the leading side edge and the regions laterally inward of the side edge by using a solid stress modifying member extending substantially parallel to the leading side edge of the glass. The stress modifying member is kept substantially parallel to and located adjacent a portion of the leading side edge of the sheet transported laterally through a lehr for bending.

The stress modifying member includes a portion maintained slightly in advance of the leading side edge of the glass sheet and another portion slightly below the leading side edge portion of the glass. According to the previous invention, stress modifying members having a vertical member located in advance of the leading edge of the glass sheet and a horizontal member located below the leading edge of a glass sheet combine to lessen the temperature gradient between the leading side edge and the portion immediately laterally within the leading side edge of the glass sheet conveyed through the annealing portion of the bending and annealing lehr. The vertical member is belived to provide necessary shielding for retarding the natural rate of cooling of the leading side edge at the peripheral margin of the glass sheet supported for bending while the horizontal member removes heat locally from the mold rail thus lessening the effect of the mold rail to retard the cooling rate of the portions immediately laterally within the leading side edge formerly subjected to high internal stresses.

The present invention utilizes a stress modifying member in the form of a perforated vertical member having a large number of spaced apertures, the apertured portion of which comprises between 5% and 20% of the area of the plate. The apertures permit some circulation of air between the ambient atmosphere of the annealing lehr and the leading edge of the glass sheet, thus reducing the likelihood of establishing a stagnant mass of hot air in the atmosphere immediately adjacent thereto as often occurs with solid members.

A perforated plate protects the entire adjacent edge of the glass sheet from dircet exposure to the air current through the lehr. Also, its thermal capacity is sufficient to retard the cooling rate at the adjacent edge of the glass sheet during the annealing portion of the bending cycle compared to its natural cooling rate. These latter two functions are similar to those obtained using solid plates as stress modifying members, without obtaining as a side result the difficulty of temperature control of the stagnant hot air mass adjacent the glass edge that sometimes occurs while using solid members.

The benefits of the present invention will be understood much more thoroughly upon studying the description of the illustrative embodiment which follows. In the accompanying drawings which form part of the disclosure:

FIG. 1 is a sectional view of a portion of a bending lehr showing a bending mold provided with a perforated plate according to the present invention;

FIG. 2 is a fragmentary sectional view of a portion of the construction shown in FIG. 1 taken along the lines II—II thereof;

FIG. 4 is a fragmentary sectional view, similar to that of FIG. 2, showing an alternative construction according to the present invention.

Figure 3:
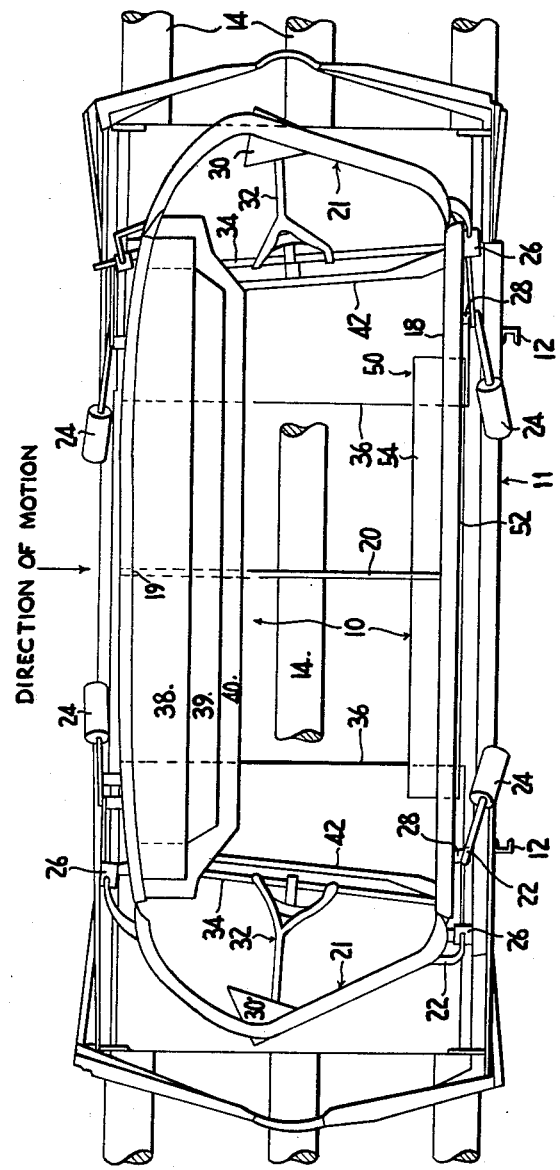
FIG. 3 is a plan view of a bending mold provided with a perforated plate in accordance with the present invention.

In the drawings, reference number 10 refers generally to a bending mold that is mounted on a support carriage 11. The mold support carriage includes carriage rails 12 extending transversely thereof.

A lehr 13 is shown in cross section in FIG. 1. This lehr is of the conventional tunnel type including conveyor rolls 14 which rotate and support the carriage rails 12 for moving the mold 10 and carriage 11 transversely through the lehr. Overhead heaters 16 are provided in the lehr above the path of movement of the mold 10 along conveyor 14 to supply the heat necessary to raise the temperature of glass sheets supported on the mold to the glass softening point.

The sectionalized mold 10 includes a center mold section 17 including spaced longitudinally extending edgewise disposed rails 18 and 19, the upper surfaces of which provide portions of the glass shaping surface. Rail 18 is constructed to support a portion adjacent the leading side edge of the bent glass sheet and rail 19 is constructed to support a portion adjacent the trailing side edge of the bent glass sheet. The terms "leading side edge" and "trailing side edge" refer to the orientation of the sheet passing through the lehr. A curved reinforcing rod 20 interconnects the rails 18 and 19 of the center mold section 17.

Flanking the center mold section are end mold sections 21 which comprise edgewise disposed curved rails adapted to move into the closed mold position depicted in FIGS. 1 and 3 to provide with the rails 18 and 19 of the center mold section 17 a substantially continuous frame conforming in elevation and outline to the shape desired for the bent glass sheet. Crooked weight arms 22 having counterweights 24 attached to their longitudinally inner extremities are attached to the end mold sections 21 and are rotatable about pivot brackets 26 carried by the center mold section 17. Stops 28 are provided for contact by the weight arms 22 to prevent the end mold sections 21 from rotating beyond the orientation desired for the closed mold position.

Heat absorber members 30 of relatively high thermal capacity compared to glass are mounted on support structures 32. The latter are cantilevered to additional support rods 34. The purpose of the heat absorber members 30 is to abstract heat from the region adjacent the tips of the glass sheet when the flat glass sheets are mounted on the bending mold held in the spread mold position. Therefore, the extremities of the glass sheet are kept at a lower temperature than the areas slightly inwardly thereof which are to be bent to severe curvatures. As the glass sheet is folded upwardly upon rotation of the end mold sections 21 about the pivots provided about the pivot brackets 26, the glass sheet extremities move away from the heat absorber members 30, thereby lessening the temperature moderating effect of the heat absorber members on the glass sheet tips. This permits the glass sheet extremities to reach temperatures within the annealing range but below the softening point. Therefore, while the glass sheets are bent to non-uniform curvatures including relatively flat extremities, the glass sheet extremities are permitted to reach a sufficiently high temperature to permit the entire glass sheet to anneal properly without inducing steep thermal gradients tending to induce glass fracture by virtue of thermal shock.

Additional heat absorber plates 36 of large thermal capacity are carried obliquely by carriage 11 beneath the glass support level to retard the heating of the bottom glass sheet by selective heat abstraction therefrom. Absence of such additional heat absorber plates permits the bottom sheet to heat more rapidly than the top sheet and thereby form a gap between the two sheets undergoing simultaneous bending.

Additional heat absorber plates 38, 39 and 40 of large thermal capacity compared to an equivalent area of glass are located in the central portion of the mold adjacent the trailing side edge supporting rail 19. These additional plates extend laterally inwardly of rail 19 toward rail 18 in a plane below the bottom edge of rail 18 to maintain the portion of the glass sheets supported thereover at a temperature lower than the remainder of the glass. These plates are constructed to have sufficient thermal capacity to permit the glass to reach a temperature below the softening point but within the annealing range when the portions undergoing bending reach glass softening temperatures.

The central absorber plates 38, 39 and 40 are mounted in echelon to provide a vary heat absorbing effect so as to minimize temperature gradients between the regions of the glass sheet remote from any heat absorber members and those which are adjacent the heat absorber members. Transversely extending supports 42 are provided to carry the central heat absorber plates 38, 39 and 40.

An apertured plate 52 having apertures 53 and an additional portion in the form of a horizontally oriented member 54 is provided to embrace the central portion of the leading center section rail 18. The apertured plate 52 is laterally spaced from rail 18 and extends upwardly in a vertical plane parallel to and laterally outwardly of a plane including rail 18. Its upper portion is located above the upper edge of rail 18 and its lowermost portion is located below the shaping surface provided by the upper edge of rail 18. Horizontal member 54 is attached to the bottom extremity of the vertical member 52 and extends below the leading center mold section rail 18 in a direction transversely of the mold towards the center thereof.

If desired to adjust the vertical position of the stress modifying member 50, an externally threaded rod 56 may be attached at its bottom to horizontal member 54 by welding as shown in FIG. 2. A link may interconnect the upper edge of the threaded rod 56 with the center section rail 18. A lock nut 60 may be threadedly mounted to the threaded rod 56 to bear against the upper surface of an apertured tab 62 fixed to rail 18. Rotation of the lock nut 60 adjusts the vertical postion of the stress modifying member 50 relative to rail 18.

FIG. 4 shows an alternative embodiment in which the apertured plate 52 is loosely supported near each longitudinal extremity in a grooved post 64 attached directly to any portion of the mold support carriage 11 that is suitable. This embodiment does not incorporate a horizontal member.

*Example I*

A typical apertured baffle plate used was a metal plate 42 inches long, 3 inches wide and 1/16 inch thick provided with three rows of 41 apertures each. Each aperture was 5/16 inch diameter and spaced about 1 inch center to center from its adjacent aperture. The apertures were arranged in a rectangular or checkerboard pattern and provided about 7.5% of the area of the apertured plate. The apertured plate was mounted between 1/2 and 1 inch from a center rail of a skeletonized mold. Compression stresses at the edge of glass sheets and tension stresses within the compression stress edge were compared for glass sheets bent on molds provided with an apertured baffle plate and those bent on unmodified molds. Not only were the stresses reduced to considerably less than half their former values, but spontaneous breakage was substantially eliminated after the apertured plates were installed. This reduction in breakage was attributed to the reduction in tension stress.

Ten molds of a particularly difficult production pattern were each provided with an apertured plate and were used for an 8 hour shift with the remaining molds constructed without apertured plates during this experiment. The average tension stress for glass sheets bent on the modified molds containing the apertured plates was less than one-half that for the glass sheets bent on molds whose construction did not include the aperture plate. Furthermore, there was no breakage of glass on any of the modified molds, although there was considerable glass breakage of the sheets bent during this shift on unmodified molds. As a result of this test, all the molds of the complement for the pattern in question were converted by adding a perforated plate as herein described. Breakage and stress problems have remained much less than before the changeover.

*Example II*

The same type of apertured plates were installed on molds conveyed through a lehr having a natural drift through the lehr in the direction of movement of the glass sheets. In this case, the rear side edge of the glass sheets was subject to some breakage. Locating the apertured plates behind the center section rail supporting the rear longitudinal side edge of the glass sheet traversing the lehr eliminated this source of glass breakage. Lowering the stresses imposed at the rear marginal edge and adjacent the rear marginal edge of the glass sheets also resulted from employing the apertured baffle plates in this position.

What is claimed is:

1. In a skeletonized mold for bending and annealing glass sheets, said mold comprising an upper shaping surface of skeleton outline adapted for movement through a tunnel-like bending and annealing lehr in a predetermined orientation, the improvement comprising a stress modifying member for reducing stress along the longitudinal, marginal edge of said glass sheets consisting essentially of an apertured plate extending longitudinally substantially parallel to a portion of the leading edge of said skeleton outline and located slightly in advance of said leading edge, said apertured plate having an upper portion located above said leading edge of said shaping surface and a lower portion located below said leading edge portion of said shaping surface.

2. The combination according to claim 1, wherein the apertured portion of said apertured plate comprises between 5 percent and 20 percent of the area of said apertured plate.

3. In a sectionalized, skeletonized mold for bending elongated glass sheets comprising a central mold section and end mold sections flanking said central mold section and pivotally connected thereto between a spread mold position to support a flat glass sheet for bending and a closed mold position wherein the end mold sections are adjacent the central mold section to provide therewith a substantially continuous shaping surface of skeleton outline, said central mold section comprising a pair of longitudinally extending shaping rails laterally spaced one from the other and having upper shaping surfaces, the improvement comprising a stress modifying member for reducing stress along the longitudinal, marginal edge of said glass sheets consisting essentially of an apertured metal plate located laterally outwardly of one of said rails and extending longitudinally substantially parallel to a portion of said rail, said apertured plate having an upper portion located above the highest portion of said rail shaping surfaces and a lower portion located below the lowest portion of said rail shaping surfaces.

4. In a skeletonized mold for bending and annealing glass sheets, said mold comprising an upper shaping surface of skeleton outline disposed in a substantially horizontal plane, the improvement comprising a stress modifying member for reducing stress along the longitudinal, marginal edge of said glass sheets consisting essentially of an apertured metal plate located in a substantially vertical plane adjacent to and laterally outwrdly of a portion of said outline shaping surface, said apertured metal plate having an upper portion located above said adjacent portion of said shaping surface and a lower portion located below said adjacent portion of said shaping surface.

5. In a skeletonized sectionalized mold for bending elongated glass sheets comprising a central mold section and end mold sections flanking said central mold section and pivotally connected thereto for movement between a substantially horizontally disposed spread mold position to support a flat glass sheet for bending and a closed mold position wherein the end mold sections are disposed in end-to-end relationship with the extremities of the central mold section to provide therewith a substantially continuous shaping surface of skeleton outline, said central mold section comprising a pair of longitudinally extending shaping rails laterally spaced one from the other and having upper shaping surfaces, the improvement comprising a stress modifying member for reducing stress along the longitudinal, marginal edge of said glass sheets consisting essentially of an apertured metal plate located in a substantially vertical plane adjacent to and laterlly outwardly of one of said center section shaping rails, said apertured metal plate having an upper portion located above the highest portion of the shaping surface of said adjacent shaping rail and a lower portion located below the lowest portion of said adjacent shaping rail.

References Cited by the Examiner

UNITED STATES PATENTS

| | | | |
|---|---|---|---|
| 2,348,278 | 5/44 | Boyles et al. | 65—288 |
| 2,450,297 | 9/48 | Pearse et al. | 65—103 |
| 2,526,359 | 10/50 | Jendrisak | 65—287 |
| 2,608,030 | 8/52 | Jendrisak | 65—287 |
| 2,872,755 | 2/59 | Lawson | 65—287 |
| 2,893,170 | 7/59 | Carson et al. | 65—107 |
| 2,903,825 | 9/59 | Richardson | 65—288 |
| 2,910,807 | 11/59 | Du Huu Chan et al. | 65—115 |

FOREIGN PATENTS

| | | |
|---|---|---|
| 1,223,106 | 1/60 | France. |
| 710,393 | 6/54 | Great Britain. |

DONALL H. SYLVESTER, *Primary Examiner.*

ARTHUR P. KENT, *Examiner.*